June 5, 1923.  
G. S. MONSON  
DENTAL ARTICULATOR  
Filed Nov. 26, 1918  
1,457,385  
3 Sheets-Sheet 3

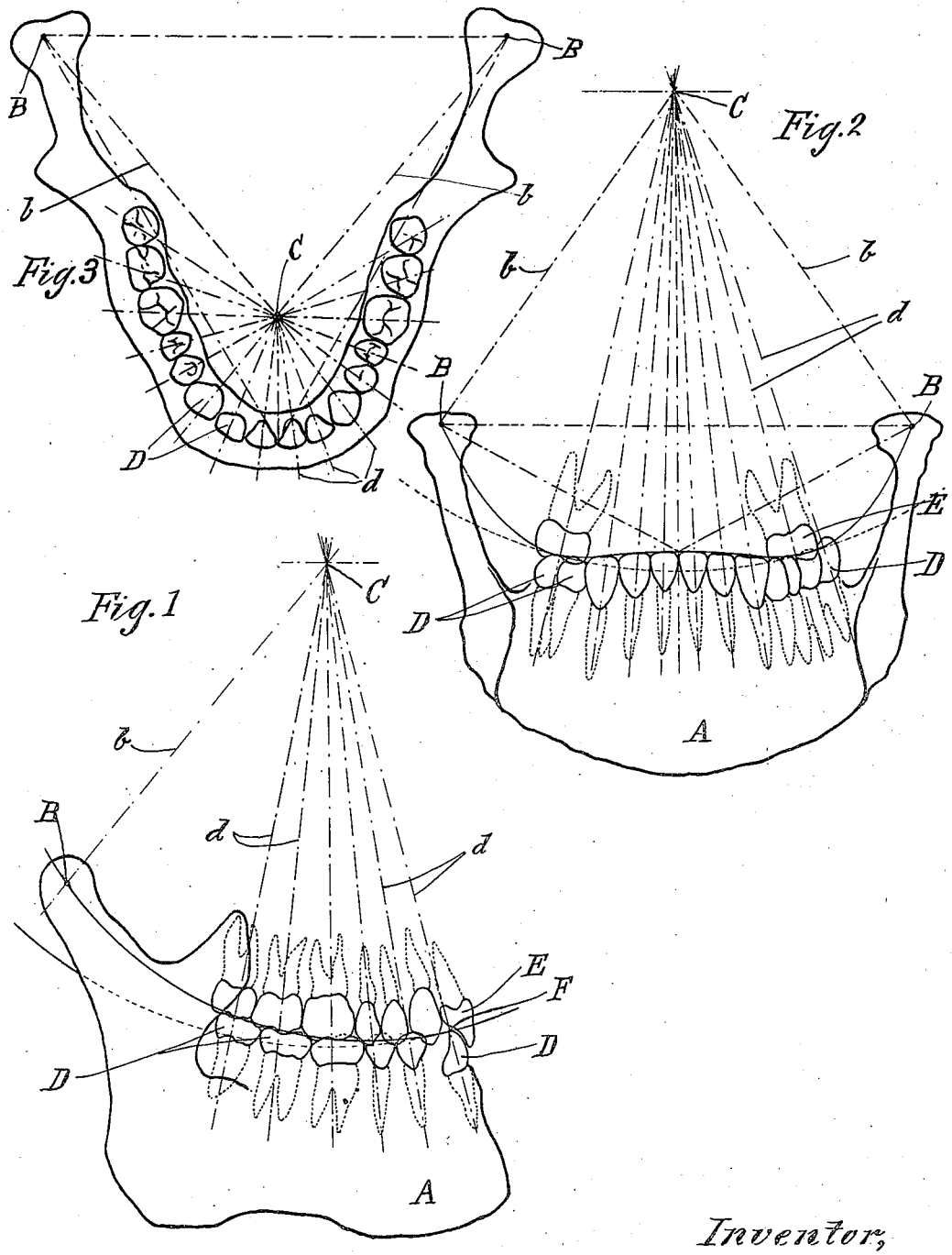

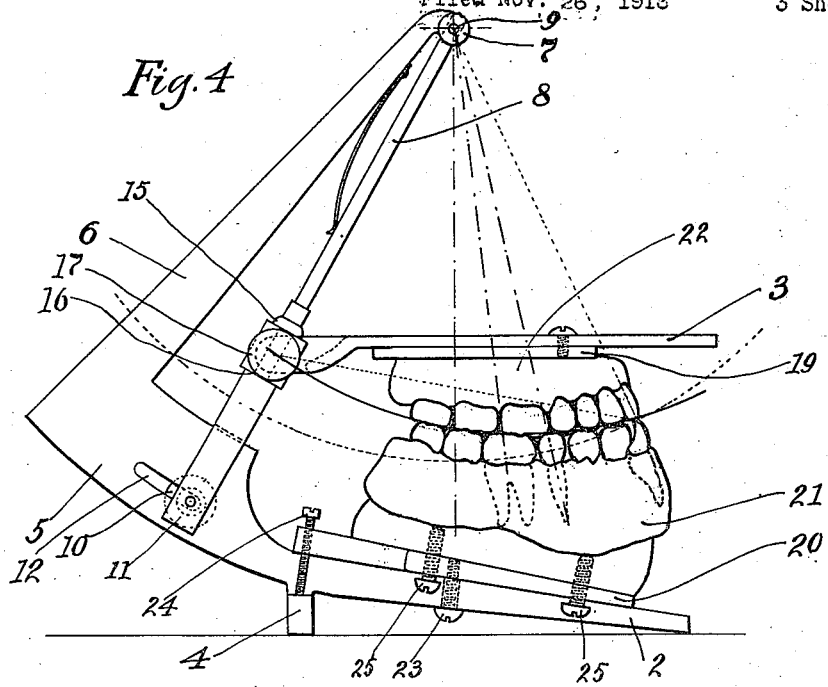
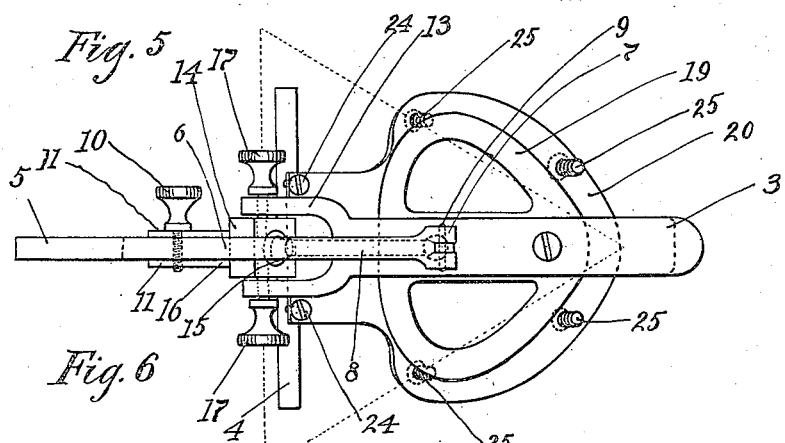
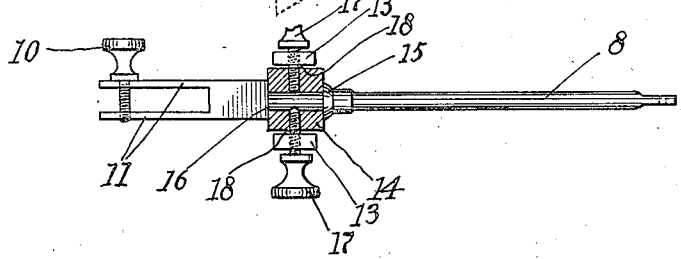

Inventor,  
George S. Monson  
By Arthur P. Lothrop  
his Attorney.

Patented June 5, 1923.

1,457,385

UNITED STATES PATENT OFFICE.

GEORGE S. MONSON, OF ST. PAUL, MINNESOTA.

DENTAL ARTICULATOR.

Application filed November 26, 1918. Serial No. 264,192.

*To all whom it may concern:*

Be it known that I, GEORGE S. MONSON, a citizen of the United States, residing at St. Paul, in the county of Ramsey and State of Minnesota, have invented certain new and useful Improvements in Dental Articulators, of which the following is a specification.

My invention relates to those devices known as dental articulators which are adapted to support oppositely disposed models of the human teeth and are constructed so that the occluding and masticating movements of the human jaw can be simulated or approximated to a greater or less degree in the teeth models upon the articulator.

It is the object of the present invention to provide an articulator wherein these occluding and masticating movements as they are produced in nature can be reproduced in the teeth models upon the articulator with such exactitude and ease as to make it possible definitely and intelligently to study the tooth development of children; to study and correct diseased conditions of the teeth and gums, due to mal-occlusion; to restore teeth to normal occlusion, and to construct artificial dentures that will articulate properly in the patient's mouth.

The invention is based upon certain novel theories I have conceived and developed regarding the anatomical structure and arrangement of the teeth, and principle of action of the jaw movements.

My hypothesis is that the axes of all the permanent teeth, when erupted in the normal jaw, converge to a common centre at approximately the same radial distance from and above the occluding surfaces of each of the teeth as from the condyle centres, the apices of the upper teeth being nearest to this centre and the apices of the lower teeth being farthest from it, as illustrated in Figs. 1 and 2 of the accompanying drawings hereinafter referred to. It follows that the condyle centres and occluding tooth surfaces will coincide with the surface of an imaginary sphere having its centre at this radial distance from them, which I have found to be about four inches, so that there will be no flat occlusal plane for the teeth but rather a spherical occlusal arc.

It is also my theory that the lower jaw is so mounted and controlled that, within the limits of movement permitted by the ligaments of the condyles or hinges of the jaw, it will swing freely in any direction as if suspended from this common centre, so that the occlusal surfaces of all the teeth will move over the surface of a sphere of which this point of suspension is the centre. I say "within the limits of movement permitted by the ligaments of the condyles", for the condyles have no movement of their own, but serve, with the co-operating fossæ of the upper jaw within which they are socketed, as elastic hinges for the occluding movements of the jaws. When the lower jaw is moved forward or sidewise on the planes of the cusps of the teeth, as in masticating, the condyle connections yield slightly and allow the condyles to be moved passively in their fossæ to the limit of their ligaments so that up to that point there is no restriction to the free movement of the jaw in carrying the lower teeth over the occlusion and across the upper teeth.

In accordance with this "spherical" theory models can be accurately articulated by arranging and fashioning the teeth so that their grinding or occlusal surfaces will conform to the surface of an imaginary sphere having its centre at approximately the same radial distance from the occlusal surfaces of all of the teeth as from the condyle centres, that is about four inches. Only when thus arranged and fashioned will the occluding surfaces of the teeth move on the occluding surfaces of the opposing teeth as in masticating, and be correctly articulated, my theory being that the lower jaw moves as if swivelled upon a universal joint at the centre of the sphere above defined.

That this theory is correct I have demonstrated experimentally by constructing articulators wherein one of the jaw model carriers is capable of a certain amount of angular or rotary movement in all directions as if swivelled upon a universal joint located at the centre of the imaginary sphere above defined, namely about four inches radially distant from the occluding surfaces of all of the teeth and from the condyles, and mounting upon them actual models of the teeth of the human beings. Then by moving the movable jaw model carrier I have found it possible to carry the model teeth very exactly into all the positions of varied occlusion that were assumed by the actual teeth in the patient's mouth, as evidenced by the facets worn upon the occluding surfaces of the teeth and by the impressions of the teeth in sheet wax with the jaws in varied positions.

In the accompanying drawings illustrating the invention,

Fig. 1 is a side elevation of the teeth and condyles as they stand normally in the human jaws with geometrical lines to illustrate the "spherical" theory of tooth structure and arrangement above set forth;

Fig. 2 is a front elevation of the same with some of the upper teeth omitted for the sake of clearness, and with illustrative geometrical lines as before;

Fig. 3 is a plan view of the condyles and lower teeth alone, with geometrical lines as before;

Fig. 4 is a side elevation of an articulator adapted for use in practising my method, wherein the movable jaw model holder is capable of the rotary or angular movements above defined;

Fig. 5 is a plan view of the same;

Fig. 6 is a view partly in elevation and partly in section of the radial pivot and its sleeve block upon which the upper jaw model carrier is mounted;

Figure 7:
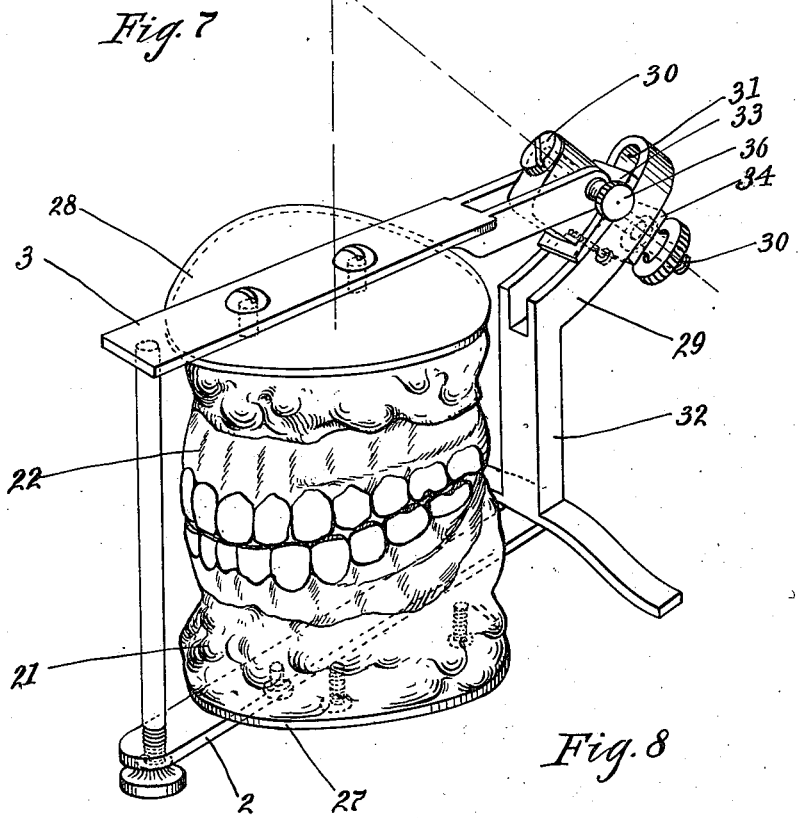
Fig. 7 is a perspective view of a modified form of articulator embodying the invention.
Figure 9:
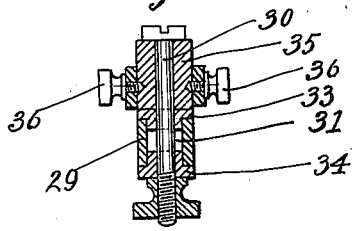
Fig. 9 is a vertical cross section of the same.
Figure 8:
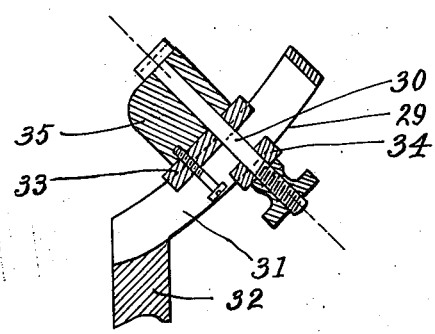
Fig. 8 is a detail in vertical longitudinal section of the mounting of the radial pivot arm.

In order to illustrate my theory of tooth formation and jaw movement, and to develop the principle upon which my improved method is based, I have shown in Figs. 1, 2, and 3 of the drawings the outline of a normal human jaw with erupted teeth having their axes convergent towards a common centre situated at the same radial distance, namely about four inches, from the occluding surfaces of the teeth as from the condyle centres, so that these occluding surfaces will coincide with the surface of a sphere of which this common point is the centre. In the drawings A represents the lower jaw, B the condyle centres, D the lower teeth and E the upper teeth. As the teeth are here shown, their longitudinal axes coincide with the dotted radial lines $d, d$, which pass through the occluding surfaces, and in a general way through the apices, of both upper and lower teeth, and converge to the common point C, while the dotted radial lines $b, b$, indicate the relation of the condyle centres B, B, to the centre C of the sphere. Thus the condyle centres B and the central incisal point of occlusion F of the teeth form vertices of a spherical triangle on the surface of a sphere having its centre at C; and they are also the vertices of the plane triangle known in the art as Bonwill's triangle.

As the most convenient and satisfactory embodiment of my invention I have devised the articulator shown in Figs. 4, 5 and 6. It comprises a relatively stationary jaw model carrier having a base 2 adapted to rest upon a table or other support, and a relatively movable jaw model carrier having a supporting arm 3. The base of the stationary jaw model carrier is preferably raised a little at the rear by means of a supporting cross bar 4, and it terminates in a heel 5 which extends back in the same vertical plane with the longitudinal axis of the jaw model carrier. From this heel a suspension arm 6 extends upwardly and forwardly to a bifurcated hub 7 located at a position corresponding to the centre of the imaginary sphere above referred to. From the centre of this hub a radial pivot arm 8 is suspended by means of a horizontal pivot 9 so that it will be guided to swing upon a transverse horizontal axis in the medial vertical plane of the jaw model carriers, that is the medial line of occlusion of the jaw models. The pivot arm is preferably bifurcated at its lower end to fit over the heel 5 whereby to confine its movements more exactly within said plane and relieve said pivot 9 from side draft, and is held in an oblique forwardly inclined position with reference to the stationary jaw model carrier by means of a thumb-screw 10 which is threaded through the bifurcated ends 11 of the arm, and passes intermediately through a curved slot 12 in the heel 5. The slot is long enough to allow the arm 8 to be swung on its pivot 9 sufficiently to reproduce in the movable jaw model carrier the forward arcuate thrust of the natural lower jaw in masticating. The arm can be secured in any adjusted position by tightening the thumb screw.

At a point upon the radial arm 8 which corresponds to the height of the condyles with reference to the centre of the imaginary sphere above referred to, or in other words at a point located at the same distance from the pivot 9 as the middle point of the straight line from condyle to condyle is from the centre of said imaginary sphere, namely about three and a half inches, the movable jaw model carrier 3 is shown sleeved upon the oblique arm 8 so as to be capable of oscillatory sidewise movement on the arm and it is also so hinged upon the arm as to be capable of up and down occluding movements upon a transverse horizontal axis. The mechanism for accomplishing this in the articulator shown in Fig. 4 of the drawings is as follows: At its inner or rear end the movable jaw model carrier terminates in bifurcated arms 13 which embrace between them a sleeve block 14. This block is sleeved upon the radial arm 8 between upper and lower shoulders 15 and 16, respectively, which maintain it at the requisite height above set forth, the lower shoulder serving as a supporting bearing for the block as it oscillates about the arm 8. The movable jaw model carrier is here shown removably hinged or pivoted to the block by means of a pair of thumb screws 17 which pass horizontally through holes in the bifurcated arms 13 and are screw-threaded into registering holes 18 in the ends of the sleeve block. The axes of the thumbscrews coincide in position with respect to the centre of the imaginary sphere above referred to (represented here by the pivot 9) with a straight line connecting the condyle centres in the human jaw, and if extended in length would cut the surface of said imaginary sphere at approximately the condyle centres as indicated by a dotted line in Fig. 5.

The jaw model carriers preferably include, besides the arms 2 and 3, plates or flat frames 19 and 20 of sufficient breadth and suitable shape to carry conveniently the jaw models 21 and 22 mounted thereon. The lower frame or plate 20 is secured at its centre upon the base arm 2 by means of a screw 23 which passes up through a hole in the arm. The hole is somewhat larger than the screw so as to allow the plate to be slightly tilted longitudinally or transversely as the case may require, by means of one or both of the adjusting screws 24.

The form of articulator shown in Fig. 7 operates on the same principle as the machine shown in Fig. 4 but is somewhat different in design. As in that machine it comprises a stationary base arm 2, and a relatively movable arm 3. Upon the opposing sides of these are plates or frames 27 and 28 to receive the jaw models 21 and 22, respectively. At the inner end of the arm 2 is an arcuate supporting guide 29 for the radial pivot arm 30, which extends through a longitudinal slot 31 in the guide. The guide extends back in the medial vertical plane of the jaw model carriers and may be supported at a convenient distance above the arm 2 by means of a post such as 32. In this form of the machine, the radial arm is supported and guided from below upon the arcuate guide instead of being suspended and guided from above as in the form shown in Fig. 4, but as the arcuate guide is curved upon the arc of a great circle having its centre approximately four inches above and radially distant from the occluding surfaces of the teeth, the pivot arm will coincide in every position with a radius of the sphere and move exactly as if suspended and guided from the centre thereof as in case of the other form of the machine. The arm is maintained in such radial relation on the guide by means of upper and lower plates 33 and 34, respectively, which run along the guide and are curved to conform to it on their contacting surfaces. The pivot arm passes radially through these plates. The upper surface of the upper plate is flat and forms a supporting bearing for the sleeve block 35 which is sleeved upon the pivot arm.

The arm 3 of the movable jaw model carrier is bifurcated at its rear end so as to straddle the sleeve block to which it is hinged to swing upon a transverse horizontal axis by means of thumbscrews 36. These thumbscrews are located at a point on the radial arm corresponding to the height of the condyles with respect to the centre of the imaginary sphere above referred to, and coincide with a line connecting the condyle centres. Thus the thumbscrews, when loose, allow the upper jaw model carrier to be swung vertically as in simple occlusion, and when tightened will hold the model carrier in upswung position, while the arcuate guide and the sleeve block allow the jaw model carrier to be oscillated back and forth and from side to side as in masticating, both of these movements being over the surface of the imaginary sphere above referred to.

In the claims I have used the terms "jaw models", and "models of the human jaws" in an inclusive way to designate the entire structure upon the carrier plates, including the trial plates and wax bites where such are used.

It will be noted that the movable jaw model is mounted to swing on two axes, i. e., laterally and vertically and these two axes are guided to move in an arcuate path with its center substantially coincident with the center of the spherical arc in which the occlusal surfaces of the teeth are located. With the jaw models supported in this way and moved in any direction in simulation of natural masticating, grinding or protrusion of one jaw with relation to the other, the teeth will maintain the same occluding relation as that maintained in nature and as a result mal-formations and positioning may be determined with certainty and corrective measures applied. Furthermore, in making artificial dentures the occlusal surfaces may be fitted and shaped to each other with the certainty that when placed in the patient's mouth occlusion will be perfect in all positions permitted by the movements of the human mandible.

It will be understood that in referring to the parts as stationary or movable, these terms are used herein in a relative sense, inasmuch as it is obvious that either jaw model may be held and the other one moved.

The part hereinbefore termed a radial pivot arm may be termed a shank or a support guided to move or swing in an arcuate path in a single plane, and the base may be termed a lower arm to support a cast plate.

I claim:

1. A dental articulator comprising a support or shank guided to move in an arcuate path in a single plane, a sleeve journaled on the support to swing transversely thereof, and held against movement lengthwise of the support, and a jaw model supporting member pivotally engaged with the sleeve whereby said member has swinging movement about an axis angular to the axis of the sleeve.

2. A dental articulator comprising a shank supported for swinging movement, a sleeve loosely mounted on the shank, means for holding the sleeve against movement lengthwise of the shank, and a jaw model supporting member pivotally engaged with the sleeve whereby said member has swinging movement about an axis angular to the axis of the sleeve.

3. A dental articulator comprising a lower arm to support a cast plate, an upstanding post carried by said arm, a shank pivotally supported by said post and having swinging movement toward or from the arm, a sleeve loosely mounted on the shank, means for holding the sleeve against movement lengthwise of the shank and a jaw model supporting member pivotally engaged with the sleeve and having swinging movement about an axis angular to the axis of the sleeve.

4. A dental articulator having oppositely disposed jaw model holders, means connecting said holders whereby one may move with relation to the other in a path which is substantially a segment of a sphere corresponding to that in which the occlusal surfaces of the teeth are located, such means comprising a support or shank mounted and supported to move in an arcuate path in a single plane, one of said holders being pivotally connected with said support by two pivotal joints movable with the support, the axis of one of said pivotal joints being fixed with relation to the support and having its inclination determined by the angular position of the support and the axis of the other pivotal joint being at substantially right angles to that of the first mentioned pivotal joint.

5. A dental articulator having oppositely disposed jaw model holders, means connecting said holders whereby one may move with relation to the other in a path which is substantially a segment of a sphere corresponding to that in which the occlusal surfaces of the teeth are located, such means comprising a support or shank mounted and supported to move in an arcuate path in a single plane, one of said holders being pivotally connected with said support by two pivotal joints movable with the support, the axis of one of said pivotal joints being fixed with relation to the support and coinciding with a radius of the center about which the support moves and the axis of the other pivotal joint being at substantially right angles to that of the first mentioned pivotal joint.

6. A dental articulator having oppositely disposed jaw model holders, means connecting said holders whereby one may move with relation to the other in a path which is substantially a segment of a sphere corresponding to that in which the occlusal surfaces of the teeth are located, such means comprising a support or shank mounted and supported to move in an arcuate path in a single plane, one of said holders being pivotally connected with said support by two pivotal joints movable with the support, the axis of one of said pivotal joints being fixed with relation to the support and coinciding with a radius of the center about which the support moves and the axis of the other pivotal joint intersecting and being at substantially right angles to that of the first mentioned pivotal joint.

7. A dental articulator comprising a jaw model carrier, a pivot arm or shank pivotally connected with said carrier to move in a substantially vertical plane whereby its inclination in said plane may be varied, a co-operating jaw model carrier pivotally mounted on said pivot arm or shank to swing in a plane normal to the pivot arm or shank and means whereby the carriers may be moved toward or from each other as in simple occlusion.

8. A dental articulator comprising a jaw model carrier, an oblique pivot arm carried by said carrier, the axis of said pivot arm coinciding with the radius of a sphere the centre of which is above and approximately equi-distant from the condyle centres and from the occlusal surfaces of all the teeth in a normal human jaw, said pivot arm being guided to move angularly about said centre in a vertical plane in the medial line of occlusion of said teeth, a co-operating jaw model carrier carried by said pivot arm and hinged thereto to afford relative movement of one of said jaw model carriers toward and away from the other, as in simple occlusion.

9. A dental articulator comprising a jaw model carrier, an oblique pivot arm carried by said carrier, the axis of said pivot arm coinciding with the radius of a sphere the centre of which is above and approximately equi-distant from the condyle centres and from the occlusal surfaces of all the teeth in a normal human jaw, said pivot arm being guided to move angularly about said centre in a vertical plane in the medial line of occlusion of said teeth, a co-operating jaw model carrier rotatably mounted upon said pivot arm, and a hinged joint between said jaw model carriers affording relative movement of one of said jaw model carriers toward and away from the other, as in simple occlusion.

10. A dental articulator comprising a lower jaw model carrier, an oblique pivot arm pivotally mounted on said jaw model carrier and guided for angular movement in a vertical plane in the medial longitudinal line of said paw model carrier, a co-operating jaw model carrier having oscillatory support upon said pivot arm to move laterally, and a hinged joint between said jaw model carriers, the axis of the hinged joint coinciding with a line corresponding to a line connecting the condyles in the human jaw.

11. A dental articulator comprising a jaw model carrier, a forwardly inclined pivot arm carried by said jaw model carrier and mounted for angular movement in a vertical plane in the medial longitudinal line of said jaw model carrier, the center of oscillation being above and substantially coincident with the center of curvature of a spherical arc in which are located the occlusal surfaces of the teeth, means for holding said pivot arm in retracted angular positions, a co-operating jaw model carrier rotatably mounted upon said pivot arm and means for locking it in adjusted positions thereon, and a hinged joint between said jaw model carriers.

12. A dental articulator comprising a jaw model carrier having an upwardly and forwardly extended bracket, a radial arm pivotally suspended from said bracket so as to swing upon a transverse horizontal axis in the medial longitudinal line of said carrier, and a co-operating jaw model carrier rotatably mounted upon said arm and having hinge connection therewith.

13. A dental articulator comprising a jaw model carrier having an upwardly and forwardly extended bracket, a radial arm pivotally suspended from said bracket so as to swing upon a transverse horizontal axis in the medial longitudinal line of said carrier, means for holding said arm in retracted oblique position with reference to the said jaw model carrier, and a co-operating jaw model carrier having rotatable and hinge support upon said arm.

14. A dental articulator comprising a jaw model carrier having an upwardly and forwardly extended bracket, a radial arm pivotally suspended from said bracket at a point corresponding to a common centre substantially equi-distant from all the teeth in a normal human jaw and mounted to swing upon a transverse horizontal axis in the medial longitudinal line of the carrier, and a co-operating jaw model carrier having rotatable and hinge support upon said arm at a point along its length corresponding to the height of the condyles in the human jaw.

15. A dental articulator comprising a jaw model carrier, an oblique pivot arm carried by said lower jaw model carrier and mounted for angular movement in a vertical plane in the medial longitudinal line of said jaw model carrier, a sleeve block sleeved upon said pivot arm at a definite point along its length, and a co-operating jaw model carrier hinged upon said sleeve block so as to swing upon a transverse horizontal axis as in simple occlusion, the axis of the hinge intersecting the longitudinal axis of the pivot arm.

In testimony whereof I affix my signature in presence of a witness.

GEORGE S. MONSON.

Witness:
H. SWANSON.